United States Patent
Morren et al.

(10) Patent No.: US 11,613,846 B2
(45) Date of Patent: Mar. 28, 2023

(54) BELT COMPRISING STEEL CORDS ADAPTED FOR WEAR DETECTION

(71) Applicant: BEKAERT ADVANCED CORDS AALTER NV, Aalter (BE)

(72) Inventors: Gerd Morren, Vilvoorde (BE); Wouter Vanreyten, Tampere (FI)

(73) Assignee: BEKAERT ADVANCED CORDS AALTER NV, Aalter (BE)

( * ) Notice: Subject to any disclaimer, the term of this patent is extended or adjusted under 35 U.S.C. 154(b) by 444 days.

(21) Appl. No.: 16/650,966

(22) PCT Filed: Oct. 22, 2018

(86) PCT No.: PCT/EP2018/078854
§ 371 (c)(1),
(2) Date: Mar. 26, 2020

(87) PCT Pub. No.: WO2019/081412
PCT Pub. Date: May 2, 2019

(65) Prior Publication Data
US 2020/0270809 A1    Aug. 27, 2020

(30) Foreign Application Priority Data
Oct. 27, 2017    (EP) .................................... 17198950

(51) Int. Cl.
*D07B 1/06* (2006.01)
*D07B 1/14* (2006.01)
(Continued)

(52) U.S. Cl.
CPC ......... *D07B 1/0613* (2013.01); *D07B 1/0626* (2013.01); *D07B 1/0633* (2013.01);
(Continued)

(58) Field of Classification Search
None
See application file for complete search history.

(56) References Cited

U.S. PATENT DOCUMENTS 6,295,799 B1    10/2001    Baranda
7,117,981 B2    10/2006    Logan et al.
(Continued)

FOREIGN PATENT DOCUMENTS

BE    655 591    3/1965
EP    0 845 672    6/1998
(Continued)

OTHER PUBLICATIONS

"Ether-Based Thermoplastic Polyurethane Elastomers (TPUR) Compounds." RTP Imagineering Plastics, 2022, https://www.rtpcompany.com/technical-info/data-sheets/series-1200-t/ (Year: 2022).*
(Continued)

*Primary Examiner* — Shaun R Hurley
*Assistant Examiner* — Grace Huang
(74) *Attorney, Agent, or Firm* — Wenderoth, Lind & Ponack, L.L.P.

(57) ABSTRACT

A belt containing steel cords, the steel cords containing strands made of steel filaments wherein the largest diameter filaments are at least intermittently positioned at the radially outer side of the steel cord. Such a configuration can be obtained by using steel cord constructions wherein the thickest filaments are positioned outside of the steel cord which is contrary to the current practice. In a further embodiment the largest diameter filaments fill up some or all of the valleys of the strands at their radially outer side. These monofilaments thus have the same lay length and direction as the strands in the steel cord. The advantage of putting the largest filaments at the outside is that they will break first and thus will be readily detectable by electrical, magnetic or (Continued)

Figure 1A:
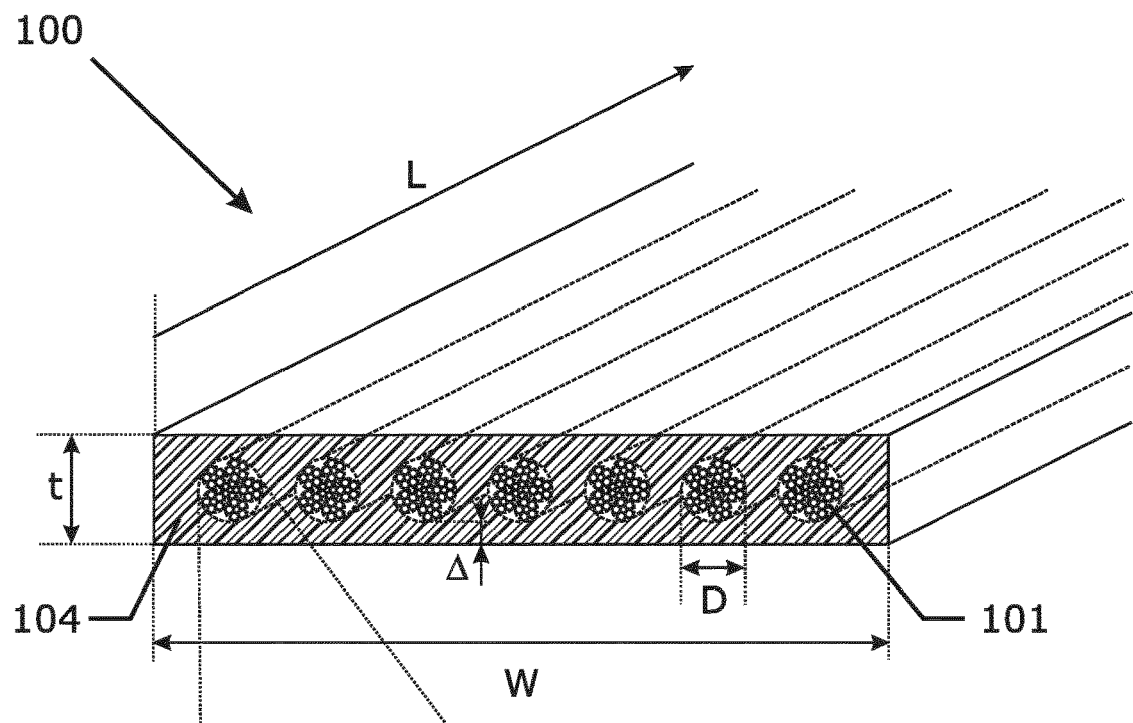

visual means. In this way a belt is provided that can be monitored easier and more conveniently than prior art belts.

12 Claims, 3 Drawing Sheets

(51) Int. Cl.
*B65G 15/36* (2006.01)
*B66B 7/06* (2006.01)
*D07B 1/22* (2006.01)
*F16G 1/12* (2006.01)
*F16G 9/04* (2006.01)
*D07B 1/00* (2006.01)
*F16G 1/28* (2006.01)

(52) U.S. Cl.
CPC ............. *D07B 1/145* (2013.01); *B65G 15/36* (2013.01); *B65G 2207/48* (2013.01); *B66B 7/062* (2013.01); *D07B 1/22* (2013.01); *D07B 1/24* (2021.01); *D07B 2201/1048* (2013.01); *D07B 2201/202* (2013.01); *D07B 2201/2007* (2013.01); *D07B 2201/2037* (2013.01); *D07B 2201/2051* (2013.01); *D07B 2201/2055* (2013.01); *D07B 2205/305* (2013.01); *D07B 2205/306* (2013.01); *D07B 2205/3028* (2013.01); *D07B 2205/3039* (2013.01); *D07B 2205/3067* (2013.01); *D07B 2301/554* (2013.01); *D07B 2301/555* (2013.01); *D07B 2301/5536* (2013.01); *D07B 2501/2007* (2013.01); *D07B 2501/2015* (2013.01); *F16G 1/12* (2013.01); *F16G 9/04* (2013.01)

(56) References Cited

U.S. PATENT DOCUMENTS

| | | | |
|---|---|---|---|
| 7,117,984 B2 | 10/2006 | Jordison et al. | |
| 8,686,747 B2 | 4/2014 | Bemer et al. | |
| 11,186,947 B2* | 11/2021 | Vanreyten | ................ F16G 1/12 |
| 2011/0253487 A1 | 10/2011 | Kocher et al. | |
| 2012/0211310 A1* | 8/2012 | Peric | ........................ B66B 7/062 |
| | | | 187/254 |
| 2014/0374195 A1* | 12/2014 | Deconinck | ................ B66B 9/00 |
| | | | 57/221 |
| 2017/0023347 A1 | 1/2017 | Ouellette | |
| 2017/0370046 A1* | 12/2017 | Rommel | ................ D07B 1/162 |

FOREIGN PATENT DOCUMENTS

| | | | |
|---|---|---|---|
| EP | 1 275 608 | 1/2003 | |
| EP | 2 172 410 | 10/2012 | |
| EP | 2 367 747 | 7/2013 | |
| EP | 1 173 740 | 5/2017 | |
| GB | 1034328 | 6/1966 | |
| WO | WO-2013023818 A1 * | 2/2013 | ............... D07B 7/08 |
| WO | 2013/119203 | 8/2013 | |

OTHER PUBLICATIONS

"Global Elastomeric Products, Inc.." Oil Industry Rubber Products, Global, Jun. 30, 2021, https://www.globaleee.com/global-news/-history/elastomers-rubbers-difference#:~:text=However%2C%20%22rubber%22%20and%20%22,a%20specific%20type%20of%20elastomer. (Year: 2021).*

International Search Report dated Jan. 14, 2019 in International (PCT) Application No. PCT/EP2018/078854.

Wolf et al., "Alternative Konstruktionen von Stahlzugträgern in Fördergurten", Kautschuk und Gummi, 1993, vol. 46, No. 9, pp. 727-731, XP000397379 with English Abstract (cited in ISR).

* cited by examiner

BELT COMPRISING STEEL CORDS ADAPTED FOR WEAR DETECTION

TECHNICAL FIELD

The invention relates to a belt comprising steel cords as they are used for hoisting applications such as in elevators and cranes. However, the invention is equally well useable in flat belts, synchronous or toothed belts or conveyor belts.

BACKGROUND ART

Since the turn of the century steel cord reinforced belts are more and more used as load carrying members for hoisting applications as for example in elevators. In this field the introduction of belts that are considerably thinner than they are wide have revolutionised the low to medium height elevator segment. Indeed, by using thin steel cords made of twisted high tensile filaments the breaking load of the belt can be increased above that of a conventional elevator steel rope and this at a fraction of the latter's weight.

The fine steel filaments allow the belts to be curbed over much smaller bending radii than the prior art steel ropes. Hence the drive sheaves can have a smaller diameter enabling the use of smaller drive pulleys connected to direct drive electrical motors. As no gearing between electrical motor and drive sheave is needed the whole drive installation can be made compact and thus allows for the elimination of an above elevator shaft machine room.

One of the concerns of the users of elevators is the surveillance of the condition of the load carrying members. While on prior art elevators steel rope defects such as wire fractures or wire kinks were visually inspected and inventoried this approach is no longer applicable for elevator belts. Indeed in the belt the steel cords are held parallel to one another in a elastomer jacket that is in general opaque. Moreover as a large number of steel cords are present inventorying the—barely visible—fine filament fractures is no longer an option. Therefore different strategies have been proposed by elevator makers to monitor the condition of the load carrying members.

A first popular idea to monitor the condition of the belt is to make use of the electrical conductivity of the steel cords in combination with the non-conductivity of the elastomer jacket. In U.S. Pat. No. 8,686,747 it is suggested to add identification resistors in series with the individual steel cords in order to be able to discriminate what steel cord has actually fractured. This can be combined with a contact to ground in order to detect piercing of a broken filament by the jacket. Additional short circuits between steel cords can also be sensed and inventoried as for example more specifically described in EP 2 172 410, EP 1 275 608 of that same applicant. In a further disclosure EP 2 367 747 of that applicant it is suggested to only detect and count changes of resistance per unit time.

Magnetic properties are alternatively considered in order to be able to identify filament fractures. To this end the steel cords in the belt are locally magnetised. Interruptions of filaments will result in a magnetic stray fields that can be detected by sensing coils, Hall sensors or magneto resistive sensors. Examples of such methodology in the field of elevators is described in EP 1 173 740. Systems based on detection of magnetic field changes are already known for a long time for analysing steel ropes (see e.g. EP 0 845 672).

Other suggestions that have been made are:
- to provide the belt with regular markings of which changes in the spacing give information on the loading condition and/or the wear of the belt: see U.S. Pat. No. 7,117,981;
- to provide the belt with a coloured indication layer parallel to but buried below a surface coating layer. The indication layer becomes visible as the wear of the belt progresses: EP 1 275 608.

All the above disclosures are however silent on the steel cord constructions that are used for those belts in connection with the method of monitoring the belt. A series of possible steel cord assemblies that are considered for use in belts is disclosed in US 2012/021130. Also U.S. Pat. No. 6,295,799 discloses a steel cord constructions that is commonly used in elevator belts of a 7×7 construction. None of these steel cord designs are optimised for detecting filament fractures by the techniques described.

DISCLOSURE OF INVENTION

It is therefore an object of the invention to provide a belt whereof the steel cords have been optimised in order to allow the early detection of a filament fracture in the belt.

According a first aspect of the invention a belt as per the preamble of claim 1 is presented. The belt comprises steel cords that are held in parallel arrangement to one another by an elastomer jacket. The elastomer jacket encases, surrounds, holds in place the steel cords. The belt has a length, a width and a thickness dimension that are locally mutually orthogonal to one another wherein the length is much longer than the width, the width being again larger than the thickness. The steel cords are all parallel to the length dimension and are arranged side-by-side in the width dimension in a single layer perpendicular to the thickness dimension.

The steel cord comprises strands twisted together with a cord lay direction and a cord lay length. The strands on their turn comprise steel filaments twisted together each of the steel filaments having a filament diameter. In a preferred embodiment the steel filaments have a round cross section when cut perpendicular to their local axis. The diameter of the steel filament corresponds with the average diameter of the round cross section. The average diameter is half the sum of the maximum and minimum diameter as measured with a micrometer having flat anvils. All steel filaments in the steel cord can be ordered according their filament diameter. For the purpose of this application groups of filament diameters that are within limits less than 8 micrometer apart are considered equal and have a nominal value equal to the average of the limits.

Characteristic of the steel cord is now that a group of largest diameter filaments can be identified that have a filament diameter that is strictly larger than the remainder of the filaments. This necessarily implies that there is a non-empty remainder i.e. that not all filaments have the same largest diameter. A further characteristic of the invention is that each of said largest diameter filaments is at least intermittently present at the radial outer side of the steel cord.

For the purpose of this application the 'radial outer side of the steel cord' is that side of the steel cord that is visible from the outside if the elastomer jacket were not present. So each one of the largest diameter filaments will at least intermittently be visible from the outside. In other words: each one of the largest diameter steel filaments will surface at the steel cord outer side and may thereafter turn inside the steel cord where after it may again reappear at the outside and so forth.

In a still other wording: the largest diameter filaments are not inside of the steel cord and at least intermittently appear at the surface of the steel cord. Hence the largest diameter filaments are present at the outside of the strands that form the outer layer of the steel cord. An alternative and equivalent wording of this feature is therefore 'wherein said largest diameter filaments are comprised in, belong to, the group of outer steel filaments of said strands'.

In an alternative preferred embodiment the steel strands consist of steel filaments and/or the steel cord consists out of strands.

Exemplary constructions for the strands are:

Strands with an empty core such as 2, 3, 4 or 5 filaments that are twisted together with a single lay length and direction;

Single layer strands of the type 'C+n×F' wherein a core filament 'C' is surrounded by 'n' outer filaments 'F' of a certain diameter. 'n' can be 3, 4, 5, 6, or 7, but most preferred is 3, 4 or 5 as in that case the outer filament diameter is larger than the core filament diameter, putting the thicker filaments at the outside;

Layered cord constructions of the type '1×$d_0$+n×$d_1$+m×$d_2$' with the proviso that the diameters radially increase from the core outwardly. An exemplary arrangement is 1×$d_0$5×$d_1$+10×$d_2$ with $d_0$<$d_1$<$d_2$.

Single lay constructions made in one operation with a single lay length and direction, again with the proviso that filament diameters increase from the core radially outward. Examples are 3×$d_0$|3×$d_1$|3×$d_2$, with $d_0$<$d_1$<$d_2$ or 1×$d_0$|5×$d_1$|5×$d_2$|5×$d_3$, with $d_0$<$d_1$<$d_2$<$d_3$ of the Warrington or Seale type.

In the known embodiments of steel cords used for the reinforcement of elevator belts and for belts in general the filaments with the largest filaments are always situated at the inside of the steel cord. See for example FIGS. 7, 8a, 8b, 9, 10, 11 and 12 of US2012/0211310 or FIG. 5 of U.S. Pat. No. 6,295,799. This appears to be based on the wish to have sufficient elastomer ingress in between the different strands of the steel cord. Also it is generally accepted that the largest filaments will receive most of the bending stress during use and as a consequence are expected to break first. As there is the desire to keep the fracture inside the cord in order to prevent filament ends coming out of the steel cord and the belt, the thicker filaments are positioned inside of the steel cord.

In contrast therewith the inventors propose a totally different approach with the belt as described in claim 1: opposite to the standard approach of elevator belts they wilfully and purposely put the largest filaments at the outside of the steel cord. This deviant approach is fruitful for the following reasons:

The largest diameter filaments will break first and will be easily detectable as they are situated at the outside of the steel cord. Various systems to detect a broken largest diameter filament will be described hereinafter;

As the largest diameter filaments are now to be found on the outside, the finer filaments are situated at the core of the steel cord or at the core of the strands. As these filaments have a lower diameter, the bending stresses induced on those filaments will be less hence they are expected to last longer than the group of filaments with the largest diameter;

As the group of largest diameter filaments carries most of the load there is no danger for loss of breaking load as long as those filaments are not broken. The integrity of the largest diameter filaments can easily be followed. Hence no significant breaking loss is expected as long as these filaments remain intact;

When a largest diameter filament breaks this can easily be detected and inventoried;

If the number and distribution of largest diameter filament fractures surpasses certain criteria further loss of breaking load can be prevented by exchanging the belt;

Configurations of steel cords wherein the largest diameter filaments are situated at the outside of the steel cord while ensuring sufficient elastomer ingress between the strands remain possible.

The steel of which the steel filaments of the strands are made is plain, high carbon steel with a typical composition having a minimum carbon content of 0.40% for example above 0.65%, a manganese content ranging from 0.40% to 0.70%, a silicon content ranging from 0.15% to 0.30%, a maximum sulphur content of 0.03%, a maximum phosphorus content of 0.30%, all percentages being percentages by weight. There are only traces of copper, nickel and/or chromium. When the minimum carbon content is around 0.80 weight %, e.g. 0.775-0.825 weight % one speaks of high-tensile steel.

The steel filaments of the strands have a tensile strength of at least 2000 MPa, preferably above 2700 MPa, while strengths above 3000 MPa such as 3500 MPa are current. At present a maximum of 4200 MPa has been obtained on very fine wires. Such high tensile strengths can be achieved by cold drawing the filaments to a sufficient degree from steel having a carbon content in excess of 0.65 wt % carbon. Tensile strength is the ratio of the breaking load of the filament (in newton, N) divided by its perpendicular cross sectional area (in square millimetre, $mm^2$);

It is largely preferred that the largest diameter filaments are made of steel in order not to induce other problems such as galvanic corrosion (e.g. if the filaments would be made of copper), reduced breaking load (as steel is one of the metals having the highest possible tensile strengths), unequal loads etc. However, this does not a priori exclude that the largest diameter filaments are made of other metals that may have advantageous properties.

Within the context of this application an 'elastomer' is an elastic elastomer material that can either be thermosetting (requiring vulcanisation or heat treatment) or thermoplastic.

Thermosetting elastomers are typically rubber materials such as natural or synthetic rubbers. Synthetic rubbers like NBR (Acrylonitrile Butadiene), SBR (Styrene Butadiene), EPDM (Ethylene Propylene Diene Monomer) or CR (Polychloroprene) or silicone rubbers are favoured. Of course different additives can be added to the polymer to adapt its properties.

Thermoplastic elastomeric materials can be e.g. thermoplastic polyurethanes, thermoplastic polyamides, polyolefin blends, thermoplastic co-polyesters, thermoplastic fluoropolymers such as polyvinylidene difluoride, or even polyoxymethylene (POM). Of these thermoplastic polyurethanes derived from a poly ether polyol, poly ester polyol or from poly carbonates are most preferred. Again these thermoplastic materials can be completed with fire retardants, wear improvement fillers, friction control fillers of organic or inorganic nature.

In a further preferred embodiment at least the largest diameter filaments are magnetisable i.e. are made of ferromagnetic materials. Ferromagnetic materials have a relative magnetic permeability larger than one, by preference above 50. Low carbon and high carbon steel are magnetisable materials. Preferably at least the largest diameter steel filaments do show remnant magnetisation. 'Remanent magnetisation' is the magnetisation that remains once a magnetic field has been removed.

The steel cords in the belt can easily be magnetised by guiding the belt through a strong, constant magnetic field oriented parallel to the steel cords. The magnetic field can be generated with a permanent magnet or by means of an electromagnet fed by a constant current. An alternative way to magnetise the steel cords in the belt is to free at least one end of the belt of elastomer and contact the steel cords with one pole of magnet that can be an electromagnet or a permanent magnet. Due to the high magnetic permeability the magnetic field will remain confined in the steel cords. Additionally at the other end of the belt the steel cords can be contacted with the opposite magnetic pole.

When a fracture occurs in the largest diameter filament this will result in the formation of a magnetic dipole field (the one end of the broken filament being the south pole the other the north pole) that can easily be detected by magnetic sensing means. As the broken largest diameter filament is mainly situated at the outer circumference of the steel cord, it is less or even not magnetically shielded by overlaying filaments. This is opposite to prior art cords wherein the largest diameter filaments are buried at the inside of the steel cord.

In order to maximise this magnetic effect the largest diameter filament should have sufficient mass as the strength of the local magnetic dipole will increase with the magnetised mass. The mass per unit length of a filament increases with the square of the diameter of the filament. To make the contribution of the largest diameter steel filaments to the mass—and hence also the breaking load and axial stiffness—sufficiently different from the remaining filaments their diameters must be at least 1% and at most 40% larger or between 5 and 30% larger or even between 5 and 25% larger taken relative to the next smaller diameter steel filament. The next smaller diameter steel filament is the steel filament with diameter just below the largest filament diameter.

An alternative insight for the above reasoning is that the ratio of the cross sectional area of each one of the largest diameter steel filaments to the total metallic cross sectional area of all steel filaments in the steel cord is between 2% and 10%, or between 3% and 10% for example between 3% and 7%. Such a ratio will result in a sufficient local distortion of the magnetic and electrical properties that can be detected.

In order to further improve the detectability of fractures in the belt, the inventors propose to add monofilaments to the steel cords. The monofilaments are made of a metal and belong to the group of largest diameter filaments. The monofilaments are twisted into the steel cord with the same cord lay length and direction as the strands. The monofilaments are situated at the radial outer side of the steel cords and fill some or all of the valleys between the strands. The diameter of the monofilaments is larger than the gap between the adjacent strands. This results in monofilaments that are contacting, are supported, are carried by the adjacent strands. The gap between the adjacent strands is the minimal distance between two circles circumscribing the strands. It suffices that only one monofilament is present in order to benefit from the advantages of the invention. However, for the stability of the steel cord, it is preferred that all of the valleys between the strands are filled with one monofilament. The number of monofilaments is then equal to the number of strands. The monofilaments act as 'indicator wires' for the wear of the belt while still contributing to the overall strength of the steel cords.

In contrast with the previous embodiments wherein the large diameter filaments are intermittently present at the radial outer side of the steel cord, these monofilaments are always to be found at the outer side of the steel cords. Hence, if these filaments break, they will always be easily detectable which is an advantage.

Depending on the detection method chosen the monofilaments may be made of different metals. For example if electrical detection is chosen, the wires may be selected to have a high electrical resistance. In that respect the use of stainless steels such as AISI 316, AISI 304 ('AISI' stands for 'American Iron and Steel Institute') is recommended as these have a 4 to 5 times higher resistivity than plain carbon steels. The change in resistance is concomitantly higher than when using plain carbon steels. However, the mentioned stainless steels are not ferromagnetic and a fracture cannot be detected by magnetic means. Alternatively non-steel filaments—like copper or copper alloy, aluminium or aluminium alloy filaments—could also be envisaged but then the change in resistance at fracture will be small and more difficult to detect.

Electrical resistance can e.g. be followed up along the individual steel cords (U.S. Pat. No. 8,686,747 B1). However, a fracture of a single filament will lead only to a minute change in resistance as all filaments are contacting in parallel. Only if there are some filaments that break at the same spot, e.g. in the case of a full fracture of a steel cord, the anomaly will be detected. Therefore a method that detects changes in resistance—rather than resistance itself—may be more appropriate (EP 2 367 747 B1).

A more preferred electrical method may be to detect any contact between a grounded member and a steel cord in the belt (EP 2 172 410 B1) which of course presumes that the elastomer jacket has been pierced by a broken filament or the jacket is worn to the extent that steel cords are present at the surface. When this method of detection is used, the inventors suggest using a steel for the monofilaments that is strong but somewhat brittle. For example a carbon steel filament that has been drawn to very high tensile strength e.g. in excess of 3700 MPa. Alternatively a steel filament having a martensitic metallographic structure can be used.

If a magnetic detection method is used low carbon steel for the monofilaments is much preferred as the magnetic permeability thereof is high in combination with a relatively high remanent magnetism. Low carbon steel has a composition with a carbon content ranging between 0.04 wt % and 0.20 wt %. The complete composition may be as follows: a carbon content of 0.06 wt %, a silicon content of 0.166 wt %, a chromium content of 0.042 wt %, a copper content of 0.173 wt %, a manganese content of 0.382 wt %, a molybdenum content of 0.013 wt %, a nitrogen content of 0.006 wt %, a nickel content of 0.077 wt %, a phosphorus content of 0.007 wt %, a sulfur content of 0.013 wt %. A possible magnetic detection system is described in EP 1 173 740 B1.

The monofilaments may of course be also made of the same steel as the filaments of the strands. This eases production of the steel cords but still allows for detection of a fracture of the filaments as they have a sufficiently large diameter and/or occupy sufficient cross sectional area of the total cross sectional area of the steel cord. Over and above the filaments have a high magnetic permeability and have electrical conductivity.

The diameter of the monofilaments is preferably smaller than the diameter of the strands for example smaller than half the diameter of the strands, or even smaller than 40% of the diameter of the strands. As mentioned: in any case the diameter of the monofilament must be larger than the gap between adjacent strands, and as the monofilaments belong to the group of the largest diameter filaments, the monofilament diameter is larger than any other filament in the steel cord.

In a further preferred embodiment the monofilaments remain within the circumscribed circle to the strands of the steel cord. The 'circumscribed circle to the strands of the steel cord' is the circle with the smallest diameter that still encircles all strands but not necessarily the monofilaments. However, it is preferred that the monofilaments remain within that circle such that the steel cord obtains an overall rounder cross section which makes it easier to process into an elastomer product.

In another preferred embodiment the group of largest diameter filaments of said steel cord consists of, is equal to, coincides with the monofilaments. This implies that the monofilaments are the largest filaments in the steel cord. Hence the monofilaments serve as an early warning of the condition of the steel cords and hence the belt. As long as not one monofilament has broken, the belt is still in good condition.

The monofilaments may in certain embodiments have a tensile strength below 2000 MPa. By giving less cold drawing deformation and/or using steels with lower carbon content such as for example 0.40 wt % carbon or even lower carbon steels such as 0.10 wt % carbon, lower strengths can be obtained for example as tensile strengths below 2000 MPa for example between 500 to 2000 MPa. As these monofilaments have the lowest tensile strength as well as the largest diameter of filaments they are bound to fracture first under repeated bending.

Although by using such low tensile strength monofilaments the overall strength will diminish this is not necessarily a problem. For example the steel cord can be first designed to meet the required breaking load of the belt without monofilaments. By then adding monofilaments to that steel cord, the breaking load of the belt can only increase. It is an accepted safety rule that the breaking load of a tension member of an elevator such as a rope or belt should never fall under 80% of the original breaking load. By choosing the number of monofilaments, the diameter and the tensile strength of the monofilaments such that the total of the breaking load of all monofilaments together remains lower than 20% of the breaking load of the steel cord (inclusive the monofilaments), one has the guarantee that the mentioned safety rule is met even if all monofilaments would break at exactly the same spot. This can rarely happen in reality (unless at a belt clamp or by very local damage of the belt). And even if all monofilaments of all steel cords in the belt fracture at the same spot the safety of the passengers in the elevator is not compromised.

Normally one expects the fractures of the monofilaments to be scattered over the different steel cords and over the length of the belt. At an isolated fracture the breaking load of the belt is locally reduced with the breaking load of one monofilament. At some distance away—say ten cord lay lengths—from the fracture the breaking load of the belt will already be restored to the normal level as the broken filament is held in the steel cord by the elastomer and is twisted in the steel cord. Although the monofilaments are specifically designed to fracture there is never a risk for the passengers in the elevators. It is the merit of the inventors to take this counter-intuitive design approach. The normal design rule is that one designs a steel cord with filaments that are strong and do not break.

In a further preferred embodiment the monofilaments may be coated with an electrically insulating layer comprising a polyvinylchloride (PVC), polypropylene (PP), polyurethane (TPU), polyoxymethylene (POM) or poly fluorocarbons such polytetrafluoroethylene (PTFE), perfluoro-alkoxy (PFA), fluorinated ethylene propylene (FEP), ethylene tetrafluoroethylene (ETFE) or similar polymers can be used as homopolymers or mixtures thereof. In this way the fracture of an individual monofilament can be detected provided that the resistance over that monofilament is monitored. If the insulating layer wears a contact between the monofilament and the cable will also be detectable.

In a further preferred embodiment at least one or two or more or all of the monofilaments are locally weakened at intervals.

With 'locally weakened' is meant that the breaking load is locally reduced over a short length for example over less than five times or less than two times the diameter of the monofilament. Such weakening can be done by mechanically deforming the wire locally for example by pinching, squeezing or flattening the wire. Alternatively the weakening can be done by locally altering the metallographic structure of the steel for example by locally heating up the wire by means of a laser pulse.

With 'at intervals' is meant that the weakening is recurring along the length of the monofilament(s). The recurrence can be irregular i.e. random but preferably it is regular or periodic. The distance between locally weakened spots can be between one tenth and one hundred of a cord lay length. The purpose of the weakening is to have a controlled weak spot where the filler wire preferably and controllably will break.

According a further highly preferred embodiment the belt comprises steel cords comprising a core around which the strands are twisted possibly together with the monofilaments. The core can comprise or consist of synthetic or natural organic fibres that are twisted into yarns. The yarns may further be twisted into a core rope. With organic fibres are meant fibres made of carbon chemistry based polymers including pure carbon. They can be of natural origin such as cotton, flax, hemp, wool, sisal or similar materials. Alternatively the yarns can be made of carbon fibres, polypropylene, nylon, or polyester. Preferably the yarns are made of fibres of liquid crystal polymer (LCP), aramid, high molecular weight polyethylene, ultra-high molecular weight polyethylene, poly(p-phenylene-2,6-benzobisoxazole and mixtures thereof.

More preferably the core comprises or consists of steel filaments twisted together to a core strand. Possible core strands can be A single steel filament;

2, 3, 4 or 5 steel filaments twisted together to a core strand;

Single layer strands such as 1+3, 1+4, 1+5, 1+6, 1+7 or 1+n representing a single steel filament around which respectively 3, 4, 5, 6, 7 or 'n' filaments are twisted;

Layered type cords such 3+6, 3+9, 1+6+12, 3+9+15, 4+10+16 wherein each successive layer comprises more filaments. The layers are twisted one on top of the other wherein each layer is at least differing in either lay length and/or lay direction;

Single lay cords wherein all filaments are twisted with the same lay direction and lay length such as compact cords, Warrington strands, Seale strands such 3|9, 3|3|6, 1|5|5|5, 1|6|6|6 and the like.

The core diameter can be measured by means of a micrometer having parallel circular anvils wherein the anvils have a diameter of at least a laylength for example 14 mm. For the purpose of this application as core diameter the maximum diameter is taken as determined over different angles across a plane perpendicular to the strand. In the same manner the diameter of the strand can be determined. It is a preferred embodiment that the core diameter is smaller than the strand diameter.

When limiting the number of outer strands to three, four or five the core diameter will necessarily be smaller than the outer strand diameter when one wants to obtain a steel cord that is stable during use. With 'stable during use' is meant that filaments and strands do not move excessively one against the other during use. Also when the number of strands is three, four or five, the diameter of the monofilaments is largest as the valleys formed between the strands is bigger. When for example six strands are used each of the strands comprising a steel filament around which six outer steel filaments are twisted—commonly known as a 7×7 construction—the diameter of the monofilaments are about equal to the outer steel filaments which is a less preferred situation.

In a further preferred embodiment of the steel cord the monofilaments have a diameter of at least 0.25 mm. Possibly all other filaments are then smaller than 0.25 mm, making the monofilaments the largest in the steel cord. The overall diameter of the steel cord is preferably less than 3 mm, or less than 2 mm or even less than 1.8 mm for example around 1.5 mm. As the depth of the valleys between the outer strands scales with the diameter of the steel cord a too large diameter will result in excessively large filler diameters leading to premature failure and extreme bending stiffness. The steel cord can therefore not be simply scaled to higher diameters without giving in on other properties. The inventors therefore limit the practical use of the invention to monofilaments with a maximum diameter of 0.50 mm or even below 0.40 mm for example below or equal to 0.35 mm. All other filaments are then necessarily also below that diameter.

In order to allow a broken filament in a belt to pierce the elastomer jacket and become visible or to contact a roller to ground for detecting the fracture it is preferred that the closest distance between the surface of the belt and any one steel cord is sufficiently short. For example that this closest distance is smaller than ten, five, four or even three times the diameter of the largest diameter steel filament. On the other hand this distance should not be too small in the sense that the time to wear off the belt surface down to the steel cords must be longer than the occurrence of a first fracture in the steel cord. For example the closest distance should be larger than half of, one or two times the diameter of the largest diameter filament. With the 'closest distance between the surface of the belt and any one steel cord' is meant the minimum of all distances between the outer surface of a steel cord and the outer surface of the belt as measured on a perpendicular cross section of a belt. This design rule can be applied on all embodiments described above.

Different inventorying rules can now be applied when filament fractures occur:

A single fracture of a largest diameter filament is an indication that the belt starts to wear, but is not yet a reason to replace the belt;

If a local concentration of fractures is detected within a certain length along the belt this is an indication that the belt is nearing its end of life;

If the total number of fractures in a belt exceeds a prescribed number the belt needs replacement;

Other strategies may of course also be considered.

BRIEF DESCRIPTION OF FIGURES IN THE DRAWINGS

Figure 1B:
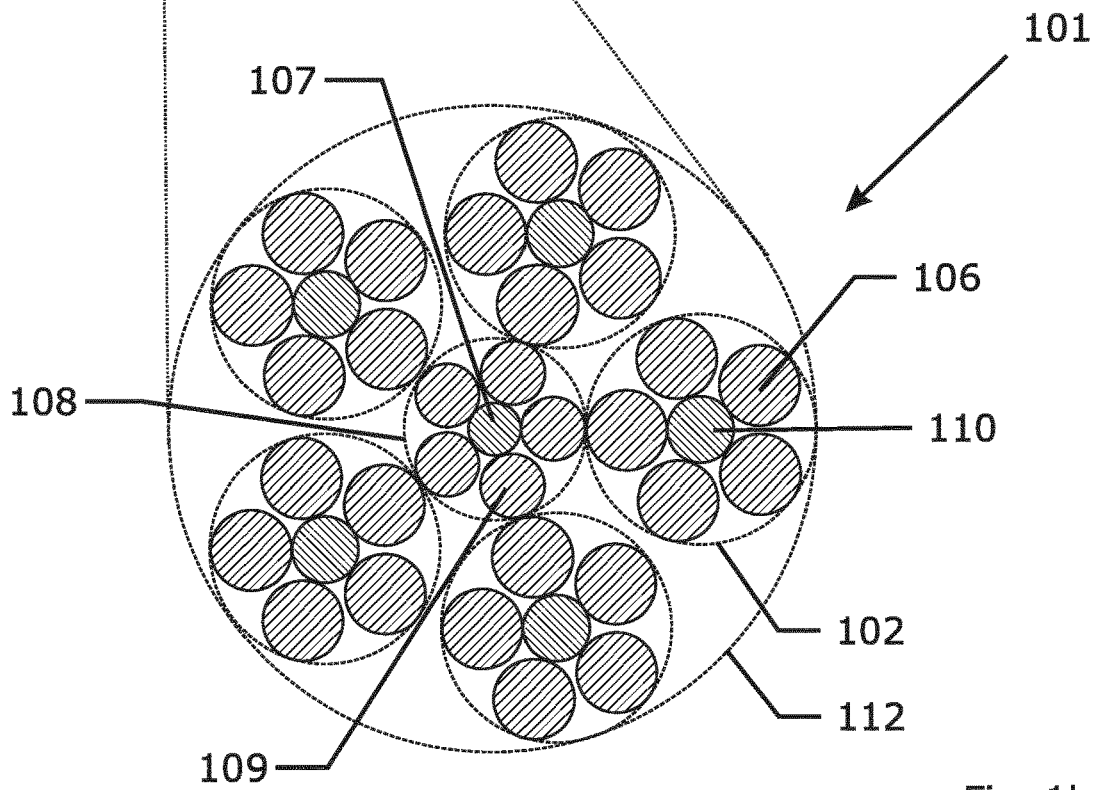

FIG. 1a: is a cross section of a belt embodying the inventive principles;

FIG. 1b: is an enlargement of the cross section of the steel cord used in the belt of FIG. 1a.

Figure 2:
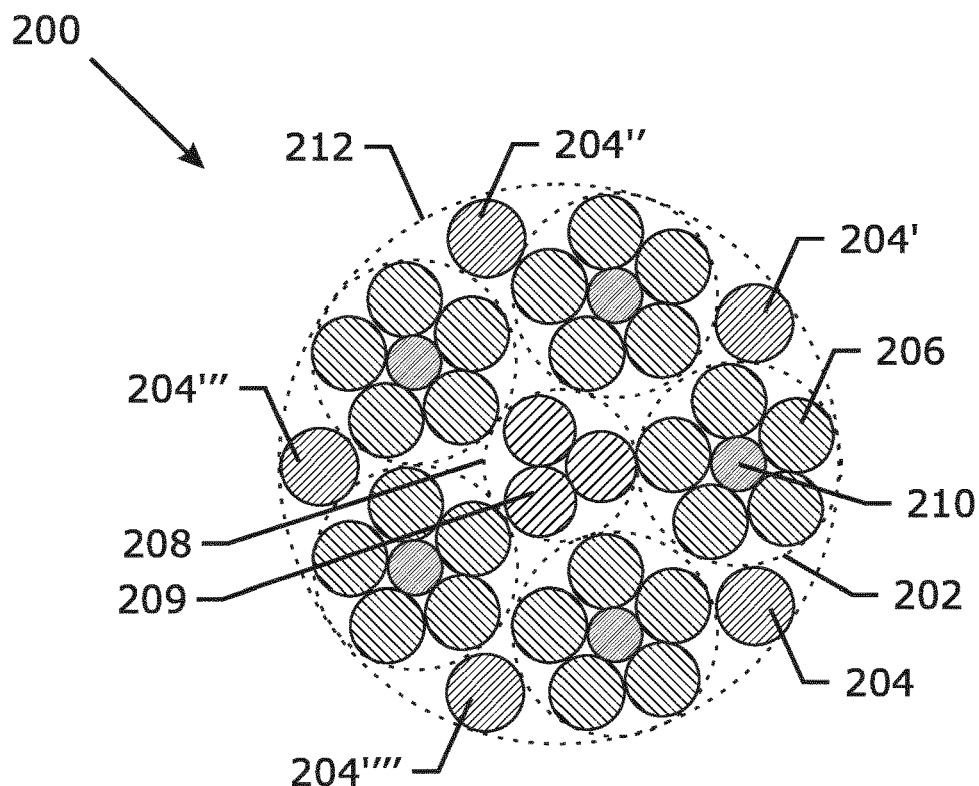

FIG. 2: is a steel cord with monofilaments for use in an inventive belt

Figure 3:
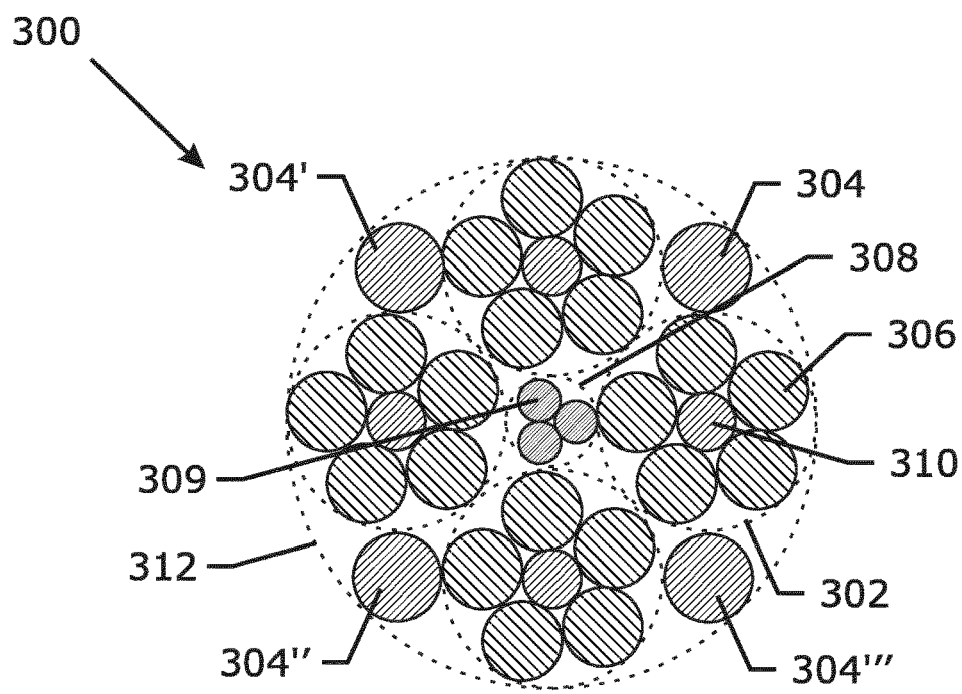

FIG. 3: is another steel cord with monofilaments for in an inventive belt

Figure 4:
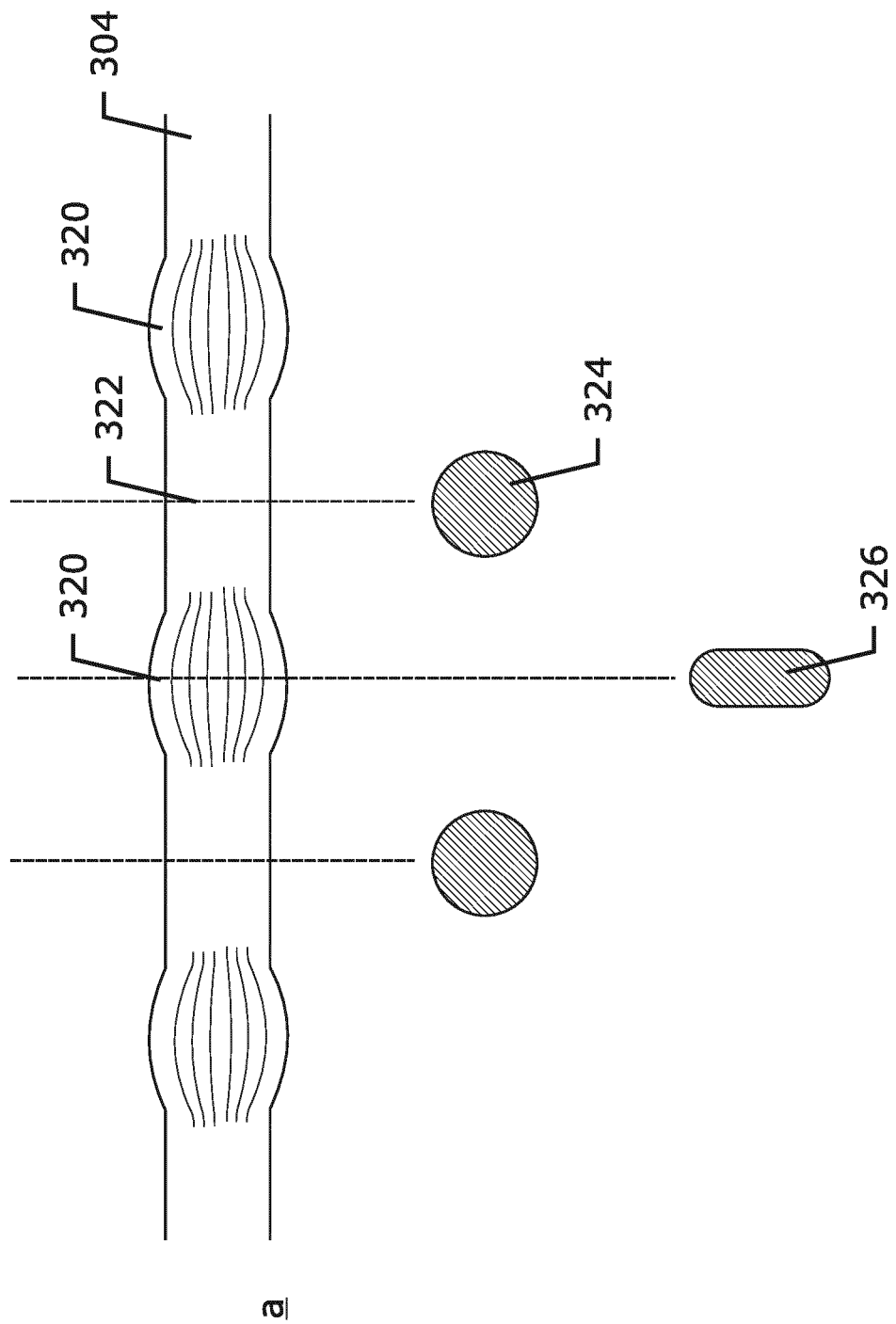

FIG. 4: shows a monofilament with local flats.

MODE(S) FOR CARRYING OUT THE INVENTION

In FIG. 1a the inventive belt with its cross section is depicted. The belt has a length dimension indicated 'L', a width indicated 'W' and a thickness indicated 't'. The steel cords 101 have a diameter indicated 'D'. They are encased in a polymer 104 that in this case is an ester polyol based thermoplastic polyurethane as is known in the art. The closest distance between the surface of the belt and any one of the steel cords is indicated with 'Δ'. For example—to put things in proportion—the length of the belt can be hundreds of meter while the width of the belt is 20 mm and the thickness 2.83 mm. The diameter 'D' of the steel cord is 1.77 mm. The shortest or closest distance 'Δ' between the surface of the belt and any one of the steel cords is 0.53 mm.

The structure of the steel cord 101 is shown in an enlarged view in FIGURE 1b. The steel cord 101 comprises five strands 102 that are wound around the core 108 with a lay length of 17 mm in S direction. The strands 102 are composed of a centre steel filament 110 around which five outer steel filaments 106 are twisted with a lay of 12 mm in Z direction. The diameter of the outer filaments is 0.23 mm. The diameter of the centre filament 110 is 0.18 mm. The structure of the core is on itself immaterial to the invention as long as it does not contain filaments that are larger than the outer filaments of the strand. In this case a core consisting of steel filaments has been chosen made of a central filament 107 of diameter 0.15 mm around which five filaments 109 of diameter 0.18 mm are wound with a lay of 10 mm in Z direction. The gap between strands is 0.028 mm. It is advantageous for the torsion behaviour of the belt to mirror the lay directions of the steel cords between neighbouring steel cords.

The group of largest diameter filaments is thus formed by the outer steel filaments 106 of size 0.23 mm that is larger than the remainder of the filaments of sizes 0.18 mm and 0.15 mm. These largest diameter filaments describe a helix around the centre filament of 0.18 mm. And the strand itself is twisted around the core in a helical shape. Hence, each one of the largest diameter filaments will—over a certain length of the steel cord—come to the surface of the steel cord. In other words: the largest diameter filaments are intermittently present at the radial outer side of the steel cord.

The largest diameter filament of 0.23 mm is in this example 27.8% larger relative to the next smaller diameter filaments of size 0.18 mm. The total cross sectional area of the cord is 1.31 mm$^2$ while the cross sectional area of a single largest diameter filament is 0.0415 mm$^2$ i.e. 3.2% of the total cross sectional area of the cord. Note that the closest distance between the surface of the belt and any one of the steel cords is 2.3 times the diameter of the largest diameter filament.

The largest diameter filaments are made of carbon steel with a carbon content of about 0.725 wt % carbon. The steel has a relative magnetic permeability of about 100. As the carbon steel is ferromagnetic and can easily be magnetised either before use or even during use. During use the belt can be led through a constant magnetic field for example generated by a DC electromagnet. The DC magnet does not have to be permanently on: now and then—for example prior to a belt inspection—restoring the loss in remanent magnetism is sufficient to allow any fractured largest diameter filament to be detected by a magnetic detector.

FIG. 2 describes an alternative embodiment for the steel cord in the belt of FIG. 1a. The steel cord 200 comprises five strands 202 that are twisted around a core 208 with a lay length of 16.3 mm in S direction. The strands 202 are made of five outer steel filaments 206 with diameter 0.23 mm that are twisted around a centre steel filament 210 of 0.17 mm diameter at lay 12 mm in Z direction. The core 208 is made of three steel filaments 209 of diameter 0.22 twisted at lay 10 Z. Particular about the construction is that it comprises five monofilaments 204, 204', 204", 204''', and 204'''' that fill up all the valleys between the strands at the radial outer side of the steel cords and have the same lay and direction as the strands in the steel cord. The monofilaments have a diameter of 0.25 mm and as they are the largest filaments, the monofilaments are the group of largest diameter filaments.

The configuration of the cord can be conveniently expressed in a cord formula:

$$[(3\times 0.22)_{10\,z} + 5\times(0.17 + 5\times 0.23)_{12\,z} | 5\times 0.25]_{16.3\,S}$$

In the mirror image of the steel cord every 'z' is replaced with 's' and vice versa.

The formula must be read as follows:
The decimal numbers indicate the diameter of the filament, integers indicate the number of filaments or strands;
The brackets contain filaments and/or strands that are laid together in one step;
The sub-indexes indicate the lay length in mm and direction;
A plus sign indicates that the items on both sides of the '+' are laid together have a different lay-length and/or direction;
A stroke indicates that the items on both sides of the '|' are laid together with the same lay-length and/or direction.

The lay direction of the strand 'z' is opposite to the lay direction of the cord 'S'. The monofilaments 204 to 204'''' all remain within the circumscribed circle 212 that is tangent to the strands 202 resulting in steel cord with a smooth outer surface. The diameter of the monofilament 204 is 0.25 mm and this is larger than the next smaller diameter 0.23 mm of the strand filament 206. Indeed the diameter of the monofilament is 8.7% larger relative to the next smaller diameter steel filament. The diameter of the monofilament is also larger than the gap between strands that in this case is 0.008 mm.

The monofilaments are made of AISI 304 stainless steel (SS) that has a fivefold higher electrical resistance than carbon steel. They also have a markedly lower tensile strength of 1750 MPa, lower than that of the other carbon steel filaments. They are therefore a good wear indicator for the belt. However, a fracture cannot easily be detected by magnetic means as the magnetic permeability of AISI 304 austenitic stainless steel remains below 10 even after cold working through wire drawing.

A brief calculation will show that the rupture of one single monofilament in the whole length of the steel cord in the elevator belt will only lead to a marginal change in electrical resistance over that steel cord. In order to improve the detection by electrical means, it is more preferred to coat the stainless steel with an electrically insulating plastic. As the monofilament then becomes electrically isolated from the remainder of the steel cord, their fracture can easily be detected by measuring the resistance of the individual monofilaments even when taken in parallel.

The comparative Table 1 below shows the features of the cord when using 0.725% carbon steel compared to a 0.725 wt % carbon prior-art cord ('Prior art') without monofilaments.

TABLE 1

| Property | 0.725 wt % C | Prior art |
| --- | --- | --- |
| Tensile strength (MPa) | | |
| 0.22 mm | 2960 | 2960 |
| 0.17 mm | 2960 | 2960 |
| 0.23 mm | 2880 | 2880 |
| (SS) 0.25 mm | 1750 | — |
| Diameter (mm) | 1.73 | 1.73 |
| Metallic cross section (mm$^2$) | 1.51 | 1.27 |
| Metallic fill factor (%) | 64 | 54 |
| Mean Breaking Load (N) | 3558 | 3340 |

Each one of the monofilaments accounts for 3.25% of the total cross sectional area of the cord.

The contribution of the monofilaments to the breaking load can easily be assessed by the following procedure:
First the breaking load of the steel cord is determined. The result is 'A' newton;
From the steel cord, the monofilaments are removed. This can easily be done, as the monofilaments are at the outer side of the steel cord;
The breaking load of the remaining cord is measured: the result is 'B' newton.

The contribution of the monofilaments to the total breaking load is then 100×(A−B)/A in percent. In the above case of 0.725 wt % C the contribution of the monofilaments to the breaking load is 8.5%. Hence, if all monofilaments would break at the same spot during use, there will still remain 91.5% of the original breaking load. It is to be noted that whatever the breaking load of the monofilaments is, they will always contribute to the breaking load of the steel cord.

According a third embodiment a cord 300 of the following make is suggested of which the cross section is shown in FIG. 3:

$$[(3\times 0.15)_{9\,z} + 4\times(0.19 + 5\times 0.265)_{14\,z} | 4\times 0.28]_{16.3\,S}$$

The mirror image has all lay directions reversed. The gap between strands is 0.009 mm.

In this case the monofilaments 304, 304', 304", 304''' of diameter 0.28 mm have been indented to locally reduce the tensile strength in order to obtain controlled weak spots. To this end the monofilaments are led in between two gears that run synchronized to one another. The phase between the gears is so adjusted that the teeth face one another (there is no gear meshing). The gap between the gear teeth is adjusted between 0.70 to 0.95 the diameter of the monofilament. When now the wire is led between the two gears two flats form diametrically to one another. This is depicted in FIG. 4 wherein the wire 304 shows cross sections 324 that are round in between the flats 320. At the flats—that are less than two times the diameter of the wire long—the cross section 326 is flattened.

The flats 320 result in a 10% lower breaking load of the monofilaments resulting in an overall decrease of the breaking load of the steel cord of 2% which is low. The flats result in controlled fracture places. If all monofilaments would be broken at the same spot, this would only result in a decreased of 14.3% in breaking load i.e. still 85.7% of the original breaking load is maintained.

As the monofilament is locally flattened the flats will maintain a gap between the monofilament and the outer strands. Such gaps are expected to improve the elastomer penetration into the core of the steel cord which is further advantage.

The invention claimed is:

1. A belt comprising steel cords held in parallel arrangement to one another by an elastomer jacket, said steel cords comprising strands twisted together with a cord lay direction and cord lay length, wherein said strands comprise steel filaments twisted together, each of said steel filaments having a filament diameter,
wherein
in each steel cord, a group of largest diameter filaments have a filament diameter that is strictly larger than the diameters of the remainder of the filaments, and wherein each of said largest diameter filaments is at least intermittently present at a radial outer side of any one of said steel cords, and
wherein the cross sectional area of each one of the filaments out of the group of largest diameter steel filaments is between 2% and 10% of the total cross sectional area of any one of said steel cords.

2. The belt according to claim 1 wherein the group of largest diameter filaments are made of steel having a relative magnetic permeability larger than 50 and wherein at least said largest diameter filaments are configured to have a remnant magnetisation.

3. The belt according to claim 1 wherein the largest diameter filaments differ in diameter by at least 1% and at most 40% with relative to the next smaller diameter steel filaments.

4. A belt comprising steel cords held in parallel arrangement to one another by an elastomer jacket, said steel cords comprising strands twisted together with a cord lay direction and cord lay length, wherein said strands comprise steel filaments twisted together, each of said steel filaments having a filament diameter,
wherein
in each steel cord, a group of largest diameter filaments have a filament diameter that is strictly larger than the diameters of the remainder of the filaments, and wherein each of said largest diameter filaments is at least intermittently present at a radial outer side of any one of said steel cords and,
wherein in any one of said steel cords, the filaments of the group of the largest diameter filaments are monofilaments made of metal, said monofilaments being twisted with said cord lay length and direction, said monofilaments filling some or all of the valleys between adjacent strands on the radial outer side of said steel cord, wherein the diameter of said monofilaments is larger than a gap between said adjacent strands.

5. The belt according to claim 4 wherein said monofilaments are configured to remain within a circumscribed circle of the strands of said steel cords.

6. The belt according to claim 4 wherein said monofilaments have a monofilament tensile strength, said monofilament tensile strength being lower than the tensile strength of any other of said steel filaments in the strands of any one of said steel cords.

7. The belt according to claim 4 wherein said monofilaments of any one of said steel cords have a total monofilament breaking load, said total monofilament breaking load being lower than 20% of the breaking load of each steel cord.

8. The belt according to claim 4 wherein at least one of said monofilaments of at least one of said steel cords is coated with an electrically insulating layer.

9. The belt according to claim 4 wherein at least one of said monofilaments of at least one of said steel cords is locally weakened at intervals.

10. A belt comprising steel cords held in parallel arrangement to one another by an elastomer jacket, said steel cords comprising strands twisted together with a cord lay direction and cord lay length, wherein said strands comprise steel filaments twisted together, each of said steel filaments having a filament diameter,
wherein
in each steel cord, a group of largest diameter filaments have a filament diameter that is strictly larger than the diameters of the remainder of the filaments, and wherein each of said largest diameter filaments is at least intermittently present at a radial outer side of any one of said steel cords,
wherein said steel cords further comprise a core, said strands being twisted around said core, and wherein a number of the strands in said steel cords is three, four or five.

11. The belt according to claim 10 wherein said core of said steel cords comprises steel filaments forming a core strand, said core strand has a core strand diameter, wherein said core strand diameter is smaller than said strand diameter.

12. A belt comprising steel cords held in parallel arrangement to one another by an elastomer jacket, said steel cords comprising strands twisted together with a cord lay direction and cord lay length, wherein said strands comprise steel filaments twisted together, each of said steel filaments having a filament diameter,
wherein
in each steel cord, a group of largest diameter filaments have a filament diameter that is strictly larger than the diameters of the remainder of the filaments, and wherein each of said largest diameter filaments is at least intermittently present at a radial outer side of any one of said steel cords, and
wherein a closest distance between a surface of said belt and any one of said steel cords is larger than half the filament diameter of said group of largest diameter filaments and smaller than ten times the filament diameter of said group of largest diameter filaments.

* * * * *